United States Patent [19]

Matsufuji

[11] Patent Number: 4,502,139
[45] Date of Patent: Feb. 26, 1985

[54] HOWLER TONE SENDING-OUT SYSTEM IN TIME-DIVISION ELECTRONIC EXCHANGES

[75] Inventor: Teruo Matsufuji, Koganei, Japan

[73] Assignee: Iwasaki Tsushinki Kabushiki Kaisha, Tokyo, Japan

[21] Appl. No.: 343,189

[22] Filed: Jan. 27, 1982

[30] Foreign Application Priority Data

Feb. 12, 1981 [JP] Japan .................. 56-19544

[51] Int. Cl.³ .............................................. H04J 3/12
[52] U.S. Cl. ................................................ 370/110.2
[58] Field of Search ............... 179/18 A, 18 B, 19, 179/84 R, 84 VF, 18 HB, 27 G, 18 J; 370/110.2

[56] References Cited

U.S. PATENT DOCUMENTS

| 3,851,110 | 11/1974 | Kelly et al. | 370/110.2 |
| 3,985,965 | 10/1976 | Fields et al. | 370/110.2 |
| 4,380,064 | 4/1983 | Ishikawa et al. | 370/110.2 |

Primary Examiner—Douglas W. Olms
Assistant Examiner—Wellington Chin
Attorney, Agent, or Firm—Robert E. Burns; Emmanuel J. Lobato; Bruce L. Adams

[57] ABSTRACT

A subscriber circuit in a time-division telephone switching system having a supervisory circuit connected to a subscriber telephone set for supervision of incoming calls, call-answering, line-busy and on-hook supervision on the telephone set. A common control circuit receives signals from the supervisory circuit through a scan circuit and when it receives a signal indicating that the handset has not been properly replaced. A howler tone source of a howler tone transmission circuit generates a low-level howler tone signal which is modulated by a modulator in the howler tone transmission circuit. This modulated tone signal is applied to a demodulator in the subscriber circuit through a speech connecting network for the transmission of speech to and from the telephone set without further need of connecting link such as a trunk line or the like. The telephone set converts the demodulated tone signal to a continuous howler tone audible signal.

2 Claims, 3 Drawing Figures

HOWLER TONE SENDING-OUT SYSTEM IN TIME-DIVISION ELECTRONIC EXCHANGES

BACKGROUND OF THE INVENTION

The present invention relates to a system for sending out a howler tone in a time-division electronic exchange.

In conventional time-division electronic exchanges, when it is desirable to send out a howler tone to a subscriber on a howler tone connection, it is necessary to disconnect the subscriber from the speech path, to send out a high-level-signal to the subscriber and to supervise its status; this calls for complex facilities and is very disadvantageous economically.

BRIEF SUMMARY OF THE INVENTION

An object of the present invention is to provide a howler tone sending-out system for time-division electronic exchanges which does not require a special circuit for sending out a howler tone but is able to send out a howler tone with a simple circuit arrangement.

In accordance with the present invention, there is provided a howler tone sending-out system in time-division electronic exchanges, characterized in that a howler tone source is provided for generating, as a howler tone signal, a low-level signal of a frequency suitable for the sensitivity of a telephone set receiver and the human auditory sense. The howler tone signal is sent out to a subscriber of the howler tone connection via a time-division modulator and a time-division speech path, and a supervisory circuit performs the function of ON-hook supervision in the howler tone sending-out status in addition to supervision of outgoing calls, incoming calls, call-answering and line-busy of each subscriber.

BRIEF DESCRIPTION OF THE DRAWINGS

The present invention will be described in detail below in comparison with prior arts with reference to the accompanying drawings, in which.

DETAILED DESCRIPTION

For ready understanding of the present invention, an example of prior arts will first be described.

Figure 1:
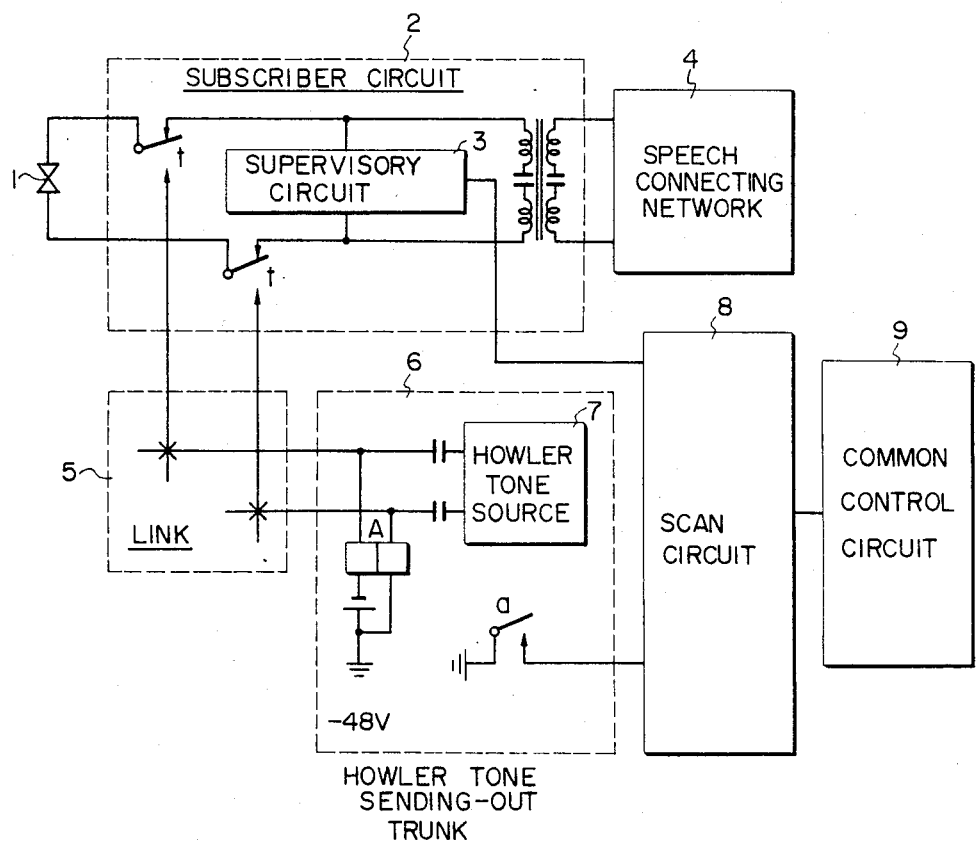
FIG. 1 is a connection diagram showing an example of prior arts.

FIG. 1 shows an example of a conventional howler tone sending out system (see Japan Pat. Disc. No. 141886/80). This howler sending out system comprises a subscriber circuit 2, a speech connecting network 4, a link 5, a howler tone sending-out trunk 6, a scan circuit 8 and a common control circuit 9. The subscriber circuit 2 is to supervise the status of each subscriber and has a supervisory circuit 3 and a contact t of a changeover relay T (not shown) the operation of which is controlled by the common control circuit 9 when a howler tone is sent out to a subscriber 1. The link 5 is to interconnect the subscriber circuit 2 and the howler tone sending-out trunk 6. The howler tone sending-out trunk 6 is provided with a howler tone source 7, a subscriber supervisory relay A and its contact a. By the contact a, information indicative of the status of the subscriber is read out into the scan circuit 8, from which it is transferred to the common control circuit 9. These components are provided separately from the speech connecting network 4.

In a known subscriber lockout status, the common control circuit 9 changes over the contact t in the subscriber circuit 2 and closes the link 5 to interconnect the subscriber 1 to the howler tone sending-out trunk 6 for sending out a howler tone to the subscriber 1. With known time-division electronic exchanges, in a case of howler tone sending out connection using a high-level signal, service is offered to the subscriber 1 without using the speech connecting network 4 as described above. In this case, it is necessary that the common control circuit 9 supervises the status of the subscriber 1 and, when the subscriber assumes the ON-hook state, stops the sending-out of the howler tone and executes a release processing. To this end, the howler tone sending-out trunk 6 supervises the status of the subscriber 1 via the relay A after completion of the connection to the subscriber 1 and transfers information by the contact a to the common control circuit 9 via the scan circuit 8. That is, before completion of the connection for sending out the howler tone, the common control circuit 9 receives information obtained by the supervisory circuit 3 of the subscriber circuit 2 and, after completion of the connection, receives information obtained by the relay A in the howler tone sending-out trunk 6. This requires that, in the supervision of the status of the same subscriber, the circuit for supervision be switched to the mode of connection even in a series of exchange service processings. Further, since the howler tone sending-out trunk 6 is employed, the sending-out of the howler tone is subject to a limitation by traffic.

The present invention will hereinafter be described in detail.

Figure 2:
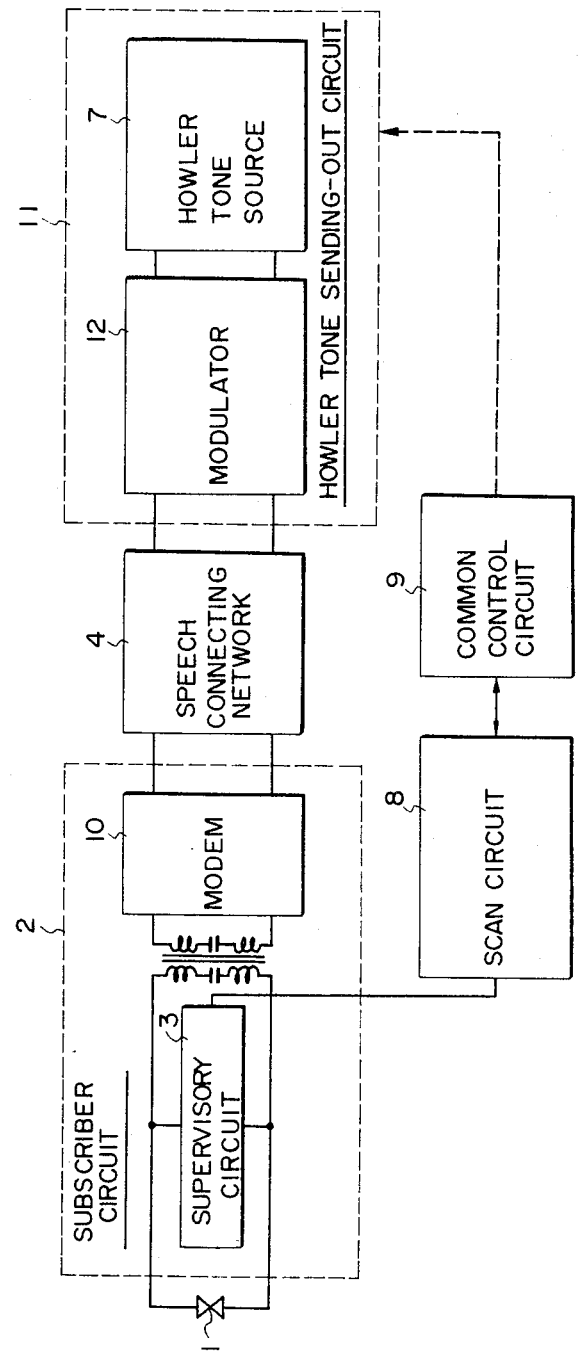
FIG. 2 is a connection diagram illustrating an embodiment of the present invention.

To achieve the abovesaid object of the present invention, a signal having a frequency of (3200±200) Hz and a level of about +6 dBm is generated from a howler tone source 7, as shown in FIG. 2, and properly interrupted and modulated, thereafter being applied from a modulator 12 to the subscriber circuit 2 via a time-division type speech path formed by the speech connecting network 4. By this arrangement, a howler tone of sufficiently useful tone color and loudness is generated from the receiver or handset of the telephone set of the subscriber 1 connected to the subscriber circuit 2; whereby a warning tone can easily be given in response to the off-hook status. In the time-division electronic exchange, a signal of +6 dBm can be passed through the speech path without a trouble and, further, the subscriber connected for sending out the howler tone can be supervised by the supervisory circuit 3 of the subscriber, so that no special supervisory circuit is required for sending out the howler tone. In addition, since no trunk is used for sending out the howler tone, no limitation is imposed on traffic.

The embodiment of FIG. 2 will be described in more detail. By starting a howler tone sending-out circuit 11 by the common control circuit 9 for sending out the howler tone to the subscriber 1, the signal from the howler tone source 7 is applied to the speech connecting network 4 via a modulator 12 in the howler tone sending-out circuit 11. This signal is demodulated by a demodulator in a modem 10 and then fed to the subscriber 1. Upon ON-hooking of the subscriber 1, the supervisory circuit 3 detects this ON-hook state and the common control circuit 9 receives an ON-hook signal from the supervisory circuit 3 via the scan circuit 8 and restores the respective circuits, performing the release processing.

Figure 3:
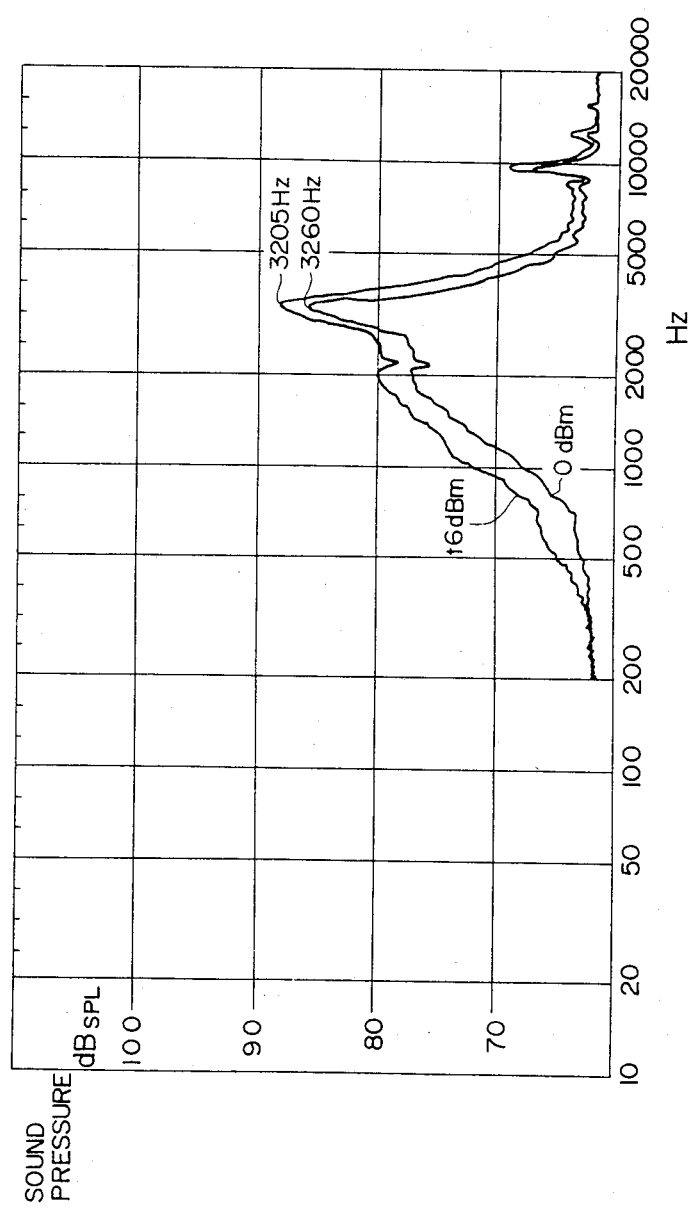
FIG. 3 is a characteristic diagram explanatory of the frequency of a howler tone source for use in the present invention.

The aforesaid (3200±200) Hz frequency of the howler tone source 7 used in the present invention is determined as a frequency width which presents a sound pressure value lower than a peak value by 3 dB on the basis of a characteristic in FIG. 3 which shows the sound pressure at a distance of 10 cm apart from the receiver, for instance, when the output of an oscillator is connected to a line terminal of the telephone set. This frequency value also somewhat varies with the characteristic of the receiver. As will be understood from this characteristic, the tone source output level can ultimately be set higher about 8 dB than in a case of selecting a frequency of, for example, 2500 Hz so without taking the characteristic of the receiver into account. Therefore, the present invention is also advantageous in terms of the dynamic range of a transmisson line.

As has been described above, in accordance with the present invention, a specific signal is sent out, as the howler source, via the time-division speech path to a subscriber of the howler tone connection; this eliminates the necessity of the trunk, link and supervisory circuit for the howler tone connection and, further, simplifies each subscriber circuit.

What I claim is:

1. In a time-division telephone switching system, a subscriber circuit having a time-division demodulator and a supervisory circuit connected to a telephone set for supervision of incoming calls, call-answering, line-busy and on-hook supervision, on said telephone set, a common control circuit for receiving on-hook status signals from the supervisory circuit representative of the off-hook state of the telephone set if the subscriber of the corresponding telephone set has not correctly replaced the handset of the telephone set after a call, a scan circuit connected to the supervisory circuit and to the control circuit for applying on-hook status signals to the control circuit, a howler tone sending-out circuit connected to receive signals from the common control circuit and having a howler tone source for transmission of a howler tone signal to the demodulator for conversion to a howler tone audible signal indicating the handset of the telephone set is not correctly replaced, a time-division modulator in said howler tone sending-out circuit for modulating the howler tone signal for time-division transmission thereof, a time-division speech connecting network for time-division transmission of speech signals between, from and to said telephone set and connected for time-division transmission of the modulated howler tone signal to the telephone set, the time-division demodulator connected in the subscriber circuit for time-division demodulating the modulated howler tone signal and applying the howler tone signal to the telephone set for conversion to said howler tone audible signal.

2. In a time-division telephone switching system, a subscriber circuit having a subscriber telephone connected therein having a time-division demodulator and a supervisory circuit connected to a telephone set for supervision of incoming calls, call-answering, line busy and on-hook supervision, on said telephone set, a common control circuit for receiving on-hook status signals from the supervisory circuit representative of the off-hook state of the subscriber's telephone set if the subscriber of the telephone set has not correctly replaced the handset of the telephone set after a call, a scan circuit connected to the supervisory circuit and to the control circuit for applying the on-hook status signals to the control circuit, a howler tone sending-out circuit connected to receiver signals from the control circuit and having a howler tone source and including means for time-division transmission of a modulated low-level howler tone signal to the demodulator at a frequency of 3200±200 Hz for conversion by said demodulator to a howler tone audible signal indicating the handset of the telephone set is not correctly replaced, a time-division speech connecting network for time-division transmission of speech from and to said telephone set and connected for time-division transmission of the modulated howler tone signal to the telephone set, the time-division demodulator connected in the subscriber circuit for time-division modulating the modulated howler tone signal and applying the howler tone signal to the telephone set for conversion to said howler tone audible signal.

* * * * *